United States Patent
Kashirajima et al.

(10) Patent No.: US 7,428,821 B2
(45) Date of Patent: Sep. 30, 2008

(54) DEHUMIDIFYING SYSTEM

(75) Inventors: Yasuhiro Kashirajima, Tokyo (JP); Takumi Sugiura, Tokyo (JP); Minoru Takahashi, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 242 days.

(21) Appl. No.: 11/257,149

(22) Filed: Oct. 25, 2005

(65) Prior Publication Data

US 2006/0086120 A1 Apr. 27, 2006

(30) Foreign Application Priority Data

Oct. 26, 2004 (JP) .............................. 2004-310916

(51) Int. Cl.
F25D 23/00 (2006.01)
(52) U.S. Cl. .......................................... 62/271; 62/304
(58) Field of Classification Search ................ 62/92–94, 62/121, 271, 272, 196.4, 304, 238.3, 238.6, 62/309, 314, 331, 480, 483; 165/4, 6, 8; 96/125, 126, 127, 153; 261/DIG. 3, 140.2, 261/142, 151, 153
See application file for complete search history.

(56) References Cited

U.S. PATENT DOCUMENTS

| | | | | |
|---|---|---|---|---|
| 4,926,618 A * | 5/1990 | Ratliff | ........................... | 95/10 |
| 5,251,458 A * | 10/1993 | Tchernev | ..................... | 62/271 |
| 5,512,083 A * | 4/1996 | Dunne | ........................ | 95/113 |
| 5,632,954 A * | 5/1997 | Coellner et al. | ................. | 422/4 |
| 5,667,560 A * | 9/1997 | Dunne | ........................ | 95/113 |
| 5,718,122 A * | 2/1998 | Maeda | ........................ | 62/185 |
| 5,891,219 A * | 4/1999 | Klobucar et al. | ............... | 95/113 |
| 6,029,462 A * | 2/2000 | Denniston | ...................... | 62/94 |
| 6,199,392 B1 * | 3/2001 | Maeda | ........................ | 62/180 |
| 6,199,394 B1 * | 3/2001 | Maeda | ........................ | 62/271 |
| 6,406,522 B1 * | 6/2002 | McFadden et al. | ............ | 95/113 |

(Continued)

FOREIGN PATENT DOCUMENTS

JP 08141353 6/1996

(Continued)

OTHER PUBLICATIONS

A translated JP 2001-021175 A.*

(Continued)

Primary Examiner—Mohammad M Ali
(74) Attorney, Agent, or Firm—Harness, Dickey & Pierce

(57) ABSTRACT

A dehumidifying system is disclosed which comprises a dehumidifying element to extract moisture from the air, a rotor to rotate the dehumidifying element, and a heat pump to cool and heat the air within the dehumidifying system. The dehumidifying unit has at least a regeneration zone and a dehumidifying zone. The dehumidifying zone is provided at a flow passage of supply air supplied to a low dew-point chamber and dehumidifies the supply air with a dehumidifying member. The regeneration zone allows regenerating air to pass through the dehumidifying member to regenerate the dehumidifying member. The heat pump is comprised of at least a condenser and an evaporator. The condenser of the heat pump is used to at least heat air passing through the regenerating zone and the evaporator of the heat pump is used to at least cool the supply air before it enters the dehumidifying zone.

4 Claims, 9 Drawing Sheets

U.S. PATENT DOCUMENTS

| | | |
|---|---|---|
| 6,758,048 B1 * | 7/2004 | Ni .................................. 62/94 |
| 7,166,149 B2 * | 1/2007 | Dunne et al. ................... 95/113 |
| 2003/0121271 A1 | 7/2003 | Dinnage et al. |
| 2004/0134211 A1 | 7/2004 | Lee et al. |

FOREIGN PATENT DOCUMENTS

| | | | |
|---|---|---|---|
| JP | 11-132506 A | * | 5/1999 |
| JP | 2000-070657 | | 3/2000 |
| JP | 2001021175 A | | 1/2001 |

OTHER PUBLICATIONS

A translated JP 08-141353 A.*

Search Report and Written Opinion for corresponding Singapore Patent Application No. 200506819-2 dated Jun. 26, 2006.

* cited by examiner

DEHUMIDIFYING SYSTEM

BACKGROUND OF THE INVENTION

1. Field of the Invention

The present invention relates to a dehumidifying system, and particularly relates to a dehumidifying system that is used in a clean room which manufactures lithium ion batteries, an industrial facility requiring an environment with low humidity and the like.

2. Description of the Related Art

In an industrial facility and a clean room facility, a large amount of external air is taken in, humidity of it is adjusted by a cooling coil or the like, and thereafter, the external air is supplied to an air-conditioned chamber. Therefore, there is the problem that a large load is exerted on a heat sink of the cooling coil in the season with high external air humidity such as a summer season. Thus, in the industrial facility and the clean room facility, a dry humidifier is used as an external air conditioner to decrease latent heat load of external air.

A dry humidifier has a humidifying rotor holding a humidifying member such as zeolite and silica gel, and by rotating the humidifier rotor, the humidifying member is alternately passed to a flow passage of supply air and a flow passage of regenerating air. The supply air is dehumidified by being passed through the dehumidifying member of the dehumidifying rotor, and is supplied to a low dew-point chamber (air-conditioned chamber). On the other hand, the regenerating air desorbs moisture adsorbed in the dehumidifying member by being passed through the dehumidifying member of the dehumidifying rotor to allow the dehumidifying member to restore dehumidifying performance. Thereby, a continuous dehumidifying operation can be performed.

Japanese Patent Application Laid-Open No. 2000-70657 discloses a dehumidifying system which supplies a part of air in the low dew-point chamber to the dehumidifying rotor. According to the dehumidifying system, running cost required for dehumidification can be reduced by performing dehumidification by utilizing air in the low dew-point chamber.

However, the above described humidifying system heats regenerating air by an electric heater, and therefore, has the disadvantage of an energy consumption amount being large and running cost becoming high.

SUMMARY OF THE INVENTION

The present invention is made in view of the above circumstances, and an object of the present invention is to provide a dehumidifying system which is capable of achieving energy saving.

In order to achieve the above-described object, a first aspect of the invention is a dehumidifying system, comprising: a dehumidifier having a dehumidifying zone which is provided at a flow passage of supply air supplied to a low dew-point chamber and dehumidifies the supply air with a dehumidifying member and a regenerating zone which allows regenerating air to pass through the dehumidifying member to regenerate the dehumidifying member, and a condenser of a heat pump provided at a flow passage of the regenerating air, and heating the regenerating air.

According to the first aspect of the invention, the regenerating air is heated by using the heat pump. Therefore, as compared with the case in which the regenerating air is heated by using an electric heater, energy efficiency can be significantly enhanced, and running cost can be reduced.

In a second aspect of the invention according to the first aspect of the invention, the dehumidifying member is held by the rotor, and the dehumidifying zone and the regenerating zone are alternately moved. Therefore, according to the second aspect of the invention, the dehumidifying member which performs dehumidification in the dehumidifying zone is regenerated in the regenerating zone, and a continuous operation can be performed.

In a third aspect of the invention according to the first or the second aspect of the invention, an evaporator of the heat pump is provided at the flow passage of the supply air, and the supply air is cooled by the evaporator. Namely, according to the third aspect of the invention, the supply air can be cooled and the regenerating air can be heated by causing heat exchange to be performed between the supply air and the regenerating air. Accordingly, cooling of the supply air by the evaporator and heating of the regenerating air by the condenser can be performed at the same time by the heat pump. Thereby, energy efficiency can be further enhanced, and running cost can be further reduced.

In a fourth aspect of the invention according to any one of the first to the third aspects of the invention, a plurality of the condensers are provided at a flow passage of the regenerating air. Therefore, according to the fourth aspect of the invention, heat exchange by the condenser can be performed more effectively, and running cost can be further reduced.

In a fifth aspect of the invention according to any one of the first to the fourth aspects of the invention, an electric heater is provided at the flow passage of the regenerating air. Accordingly, since heating of the regenerating air is performed by both the electric heater and the heat pump, the regenerating air can be heated to a higher temperature, and performance of the regenerating zone can be enhanced. Since the heat pump and the electric heater are used in combination, the temperature control with favorable responsiveness can be performed by the electric heater while energy-saving is achieved by the heat pump.

In a sixth aspect of the invention according to any one of the first to the fifth aspects of the invention, a diversion line which allows the supply air to divert and pass through the dehumidifying member, and allows air passing through the dehumidifying member to flow into the regenerating zone as regenerating air is provided, and the condenser is provided at the diversion line. Therefore, according to the sixth aspect of the invention, low-temperature air flowing in the diversion line is heated by the condenser, and therefore, thermal efficiency can be enhanced.

In order to achieve the above described object, a seventh aspect of the invention is a dehumidifying system comprising: a dehumidifier having a dehumidifying zone which is provided at a flow passage of supply air supplied to a low dew-point chamber and dehumidifies the supply air with a dehumidifying member and a regenerating zone which allows regenerating air to pass through the dehumidifying member to regenerate the dehumidifying member, and a condensing part of a heat pipe provided at a flow passage of the regenerating air, and heating the regenerating air. According to the seventh aspect of the invention, the regenerating air is heated by using the heat pipe which does not require power cost, and therefore, running cost can be significantly reduced.

In an eighth aspect of the invention according to the seventh aspect of the invention, a diversion line which allows the supply air to divert and pass through the dehumidifying member, and allows air passing through the dehumidifying member to flow into the regenerating zone as regenerating air is provided, and the condensing part is provided at the diversion line. Therefore, according to the eighth aspect of the invention, low-temperature air passing in the diversion line is heated in the condensing part of the heat pipe, and therefore, thermal efficiency can be enhanced.

In a ninth aspect of the invention according to the seventh or the eighth aspect of the invention, an evaporating part of the heat pipe is provided at the flow passage of the regenerating air after passing through the regenerating zone. Therefore, according to the ninth aspect of the invention, waste heat of the regenerating air which passes through the regenerating zone, is recovered and can be utilized for heating the regenerating air. Accordingly, thermal efficiency can be further enhanced, and running cost can be significantly reduced.

According to the dehumidifying system relating to the present invention, the regenerating air can be heated by using the heat pump or the heat pipe, and therefore, as compared with the case where the regenerating air is heated by using only an electric heater, energy efficiency can be significantly enhanced.

DETAILED DESCRIPTION OF THE PREFERRED EMBODIMENT

Figure 1:
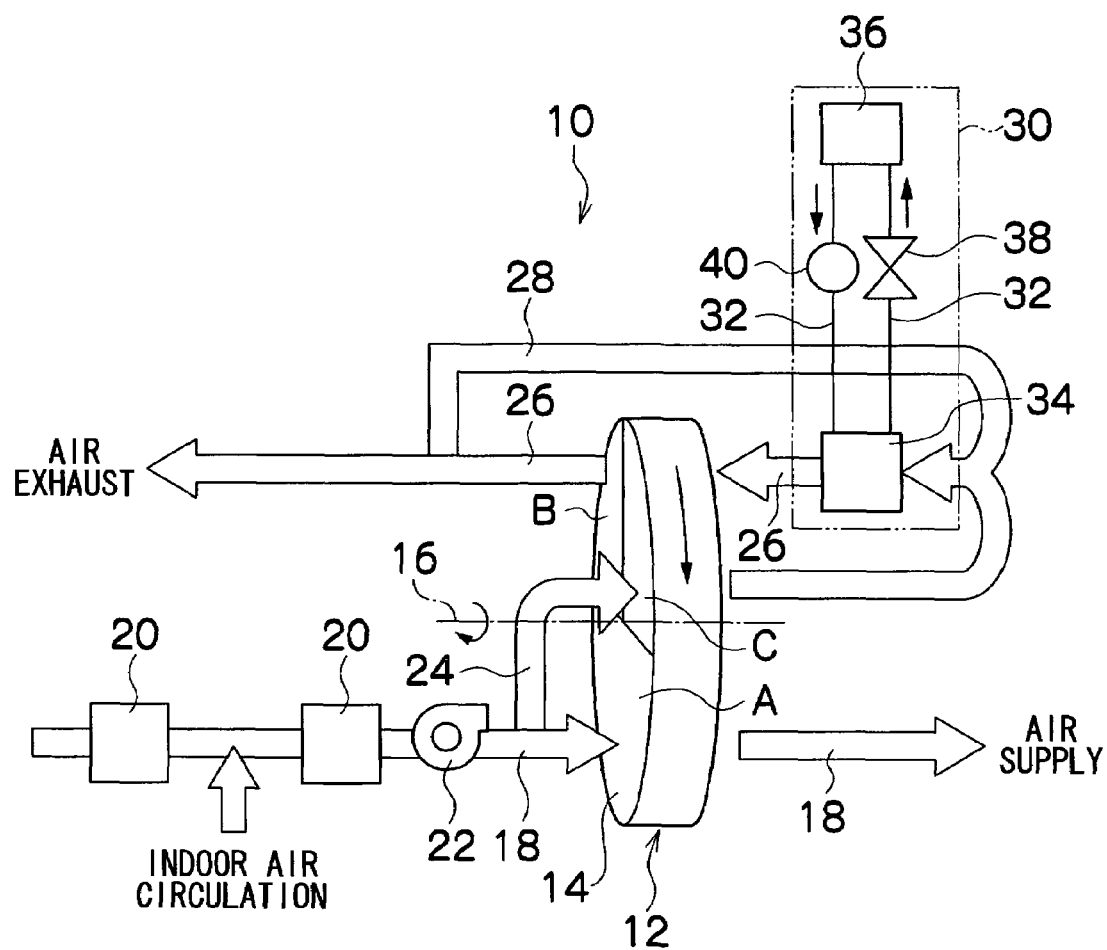
FIG. 1 is a schematic block diagram showing a first embodiment of a dehumidifying system according to the present invention.

A preferred embodiment of a dehumidifying system according to the present invention will be explained hereinafter with reference to the attached drawings. FIG. 1 is a schematic block diagram showing a first embodiment of a dehumidifying system according to the present invention.

As shown in FIG. 1, a dehumidifying system 10 has a dehumidifying rotor 12, and the dehumidifying rotor 12 rotates at a predetermined speed with an axis 16 as a center by a driving device such as a motor not shown. The dehumidifying rotor 12 holds a dehumidifying member 14 such as silica gel and zeolite.

An area of both side surfaces of the dehumidifying rotor 12 is divided into three areas by casings or partitioning plates not shown, and the dehumidifying member 14 passes through these three areas in sequence. Hereinafter, the three areas are called a dehumidifying zone A, a regenerating zone B and a purge zone C in sequence of passage of the dehumidifying member 14.

Supply air lines (corresponding to flow passages of the supply air) 18 and 18 are connected to the dehumidifying zone A of the dehumidifying rotor 12. The supply air line 18 at a right side of the dehumidifying rotor 12 communicates with a low dew-point chamber not shown, and the supply air line 18 at a left side communicates with external air. The supply air line 18 at the external air side is provided with cooling coils 20 and 20, and indoor circulating air in the low dew-point chamber is supplied to between the cooling coils 20 and 20. Further, a fan 22 is provided at the supply air line 18 at the external air side, and by driving the fan 22, the external air is taken into the supply air line 18 as supply air. The supply air taken into the supply air line 18 is cooled by the cooling coils 20 and 20. Thereafter, the supply air passes through the dehumidifying zone A of the dehumidifying rotor 12, is dehumidified by the dehumidifying member 14 of the dehumidifying zone A, and the dehumidified dry air is supplied into the low dew-point chamber. Thereby, the low dew-point chamber can be kept in the low dew-point environment.

A diversion line 24 diverging from the above described supply air line 18 is connected to the purge zone C of the dehumidifying rotor 12. Accordingly, air at low temperature flowing through the supply air line 18 is supplied into the purge zone C of the dehumidifying rotor 12 via the diversion line 24, and therefore, the dehumidifying member 14 in the purge zone C can be cooled. As a result, the dehumidifying member 14, which is heated in the regenerating zone B and rises in temperature, can be sufficiently cooled. Thereby, the dehumidifying member 14 cooled in the purge zone C passes through the dehumidifying zone A of the dehumidifying rotor 12, and therefore, dehumidifying efficiency in the dehumidifying zone A can be enhanced.

Regenerating lines (corresponding to the flow passages of the regenerating air) 26 and 26 are connected to the regenerating zone B of the dehumidifying rotor 12. The regenerating air is passed to the regenerating zone B in the opposite direction from the flowing direction of the supply air which flows through the above described dehumidifying zone A and the purge zone C. The upstream side of the regenerating line 26 communicates with the above described purge zone C, and the air passing through the purge zone C is taken into the regenerating line 26 as the regenerating air. A condenser 34 of a heat pump 30 that will be described later is provided at the regenerating line 26 at the upstream side, and the regenerating air of the regenerating line 26 is heated by the condenser 34. Accordingly, heated regenerating air is supplied to the regenerating zone B of the dehumidifying rotor 12, and by passage of the regenerating air, moisture adsorbed in the humidifying member 14 of the regenerating zone B is desorbed. Thereby, the dehumidifying ability of the dehumidifying member 14 can be restored, and therefore, when the dehumidifying member 14 passes through the dehumidifying zone A again, moisture of the supply air is sufficiently desorbed and removed.

Air passing through the dehumidifying member 14 in the regenerating zone B is discharged via the regenerating line 26 at the downstream side. An air circulation line 28 is connected to the regenerating line 26, and a tip end of the air circulation line 28 is connected to the regenerating line 26 at the upstream side of the condenser 34. Accordingly, a part of the regenerating air to be discharged is diverted, and returned to the regenerating line 26 via the air circulation line 28 and circulated and utilized as the regenerating air. By circulating and utilizing the regenerating air like this, the cost required for heating the regenerating air can be reduced.

Next, the heat pump 30 which is the characteristic part of the present invention will be described. The heat pump 30 is mainly constructed by a condenser 34, an evaporator 36, an expansion valve 38 and a compressor 40, and these components are connected by a circulation line 32 of a heat medium.

A heat medium such as carbon dioxide and alternative chlorofluorocarbons circulates in the circulation line 32. The heat medium which circulates in the circulation line 32 exchanges heat with external air or the like in the evaporator 36 first, and absorbs heat from the external air or the like and evaporates. Subsequently, the heat medium which evaporates and rises in temperature is delivered to the compressor 40, and compressed in the compressor 40 and further rises in temperature. The heat medium thus increased in temperature is delivered to the condenser 34, exchanges heat in the condenser 34 with the regenerating air flowing in the regenerating line 26, then releases heat to the regenerating air and condenses. The heat medium which condenses and lowers in temperature is expanded by the expansion valve 38, becomes lower in temperature and is returned to the evaporator 36. Then in the evaporator 36, the heat medium at low temperature exchanges heat with external air or the like again, and thereby, evaporates. The heat medium thus circulates in the circulation line 32, whereby regenerating air is continuously heated in the condenser 34. Such heat pump 30 is high in thermal efficiency. When carbon dioxide is used as the heat medium, for example, COP (value obtained by dividing a heating and cooling performance by power consumption) of about three is obtained, and about three times as much energy saving effect as an electric heater (COP=1) can be obtained.

The dehumidifying system 10 constructed as described above uses the condenser 34 of the heat pump 30 as the heating source of the regenerating air. Therefore, as compared with the case in which the regenerating air is heated by using the electric heater as in the conventional device, energy-saving can be achieved, and running cost can be reduced.

In the above described first embodiment, the purge zone C is provided at the dehumidifying rotor 12 and the air passing through the purge zone C is utilized as the regenerating air, but the present invention is not limited to such a construction, and external air, and an indoor circulating air in the low-dew point chamber may be utilized as the regenerating air. The dehumidifying rotor 12 may be constructed only by the dehumidifying zone A and the reclamation zone B.

Figure 2:
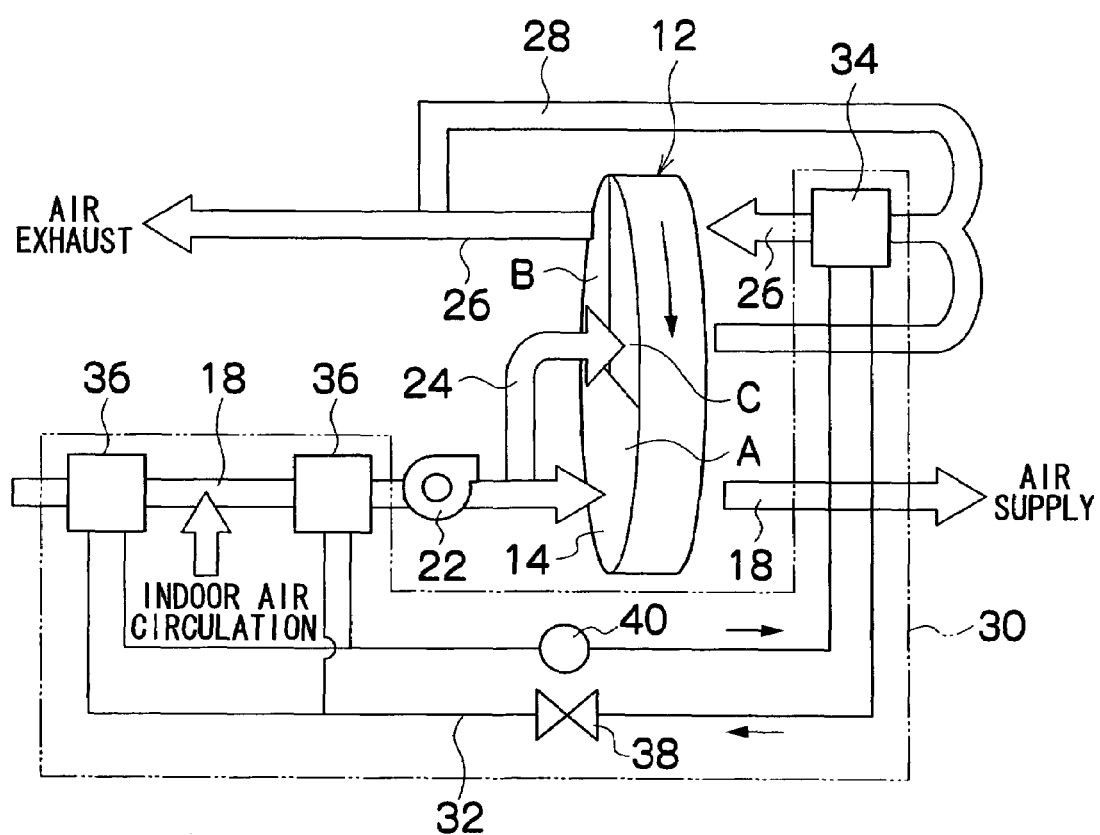
FIG. 2 is a schematic diagram showing a second embodiment of the dehumidifying system according to the present invention.

Next, a second embodiment of the humidifying system will be described. In a humidifying system of the second embodiment shown in FIG. 2, the supply air line 18 at an upstream side (left side in FIG. 2) is provided with evaporators 36 and 36 of the heat pump 30. Accordingly, when the heat medium is circulated in the circulation line 32 by driving the heat pump 30, the regenerating air of the regenerating line 26 is heated by the above described condenser 34 while supply air of the supply air line 18 is cooled by the evaporators 36 and 36. Namely, by causing the supply air of the supply air line 18 and the regenerating air of the regenerating line 26 to exchange heat with each other, cooling of the supply air and heating of the regenerating air are performed at the same time, and therefore, heat exchange rate of the entire system can be significantly enhanced.

In the above described embodiment, two evaporators 36 and 36 are provided, but the number of evaporators 36 may be one, or three or more.

Figure 3:
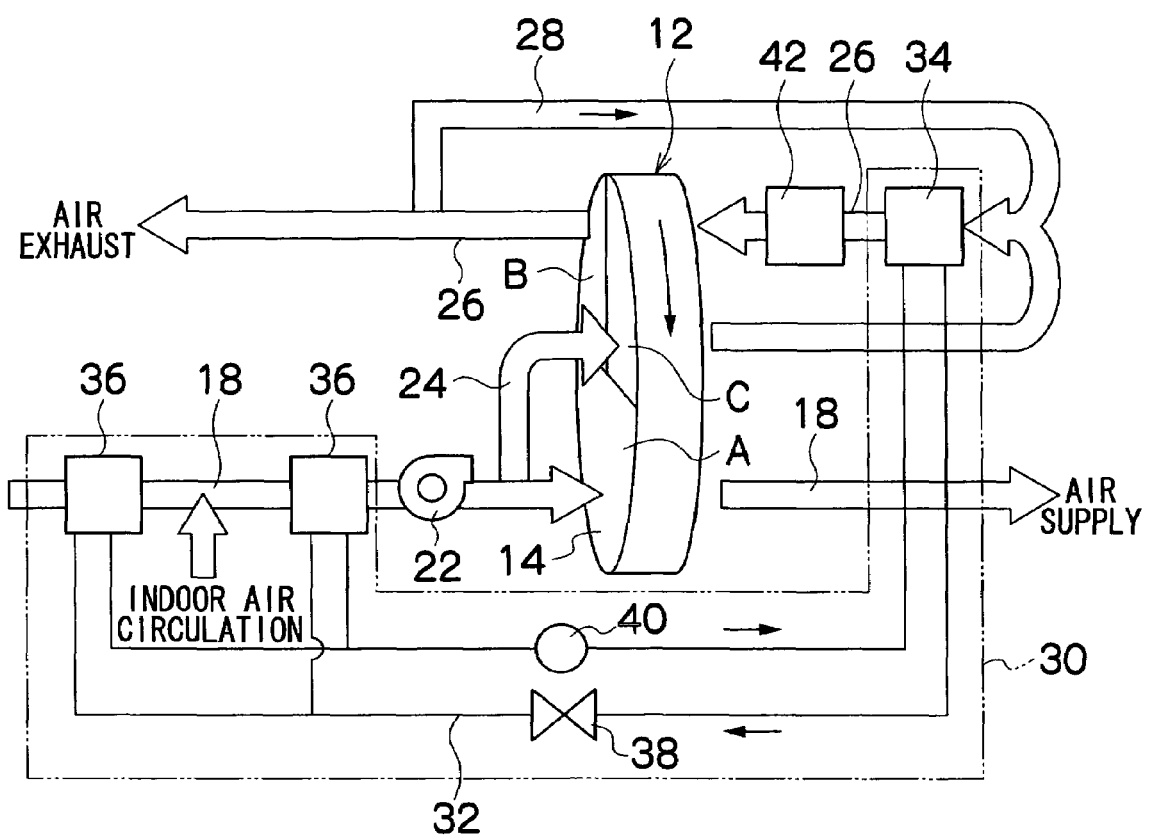
FIG. 3 is a schematic block diagram showing a third embodiment of the dehumidifying system according to the present invention.

Next, a third embodiment of the dehumidifying system will be explained. A dehumidifying system of the third embodiment shown in FIG. 3 differs in the respect that an electric heater 42 is provided at the regenerating line 26 at the upstream side (right side in FIG. 3) as compared with the dehumidifying system shown in FIG. 2. The electric heater 42 is placed at the downstream side of the condenser 34 in a flow direction of the regenerating air, so that the regenerating air heated in the condenser 34 is further heated in the electric heater 42. A temperature sensor not shown is provided between the condenser 34 and the electric heater 42, and the electric heater 42 is controlled based on the measured value of the temperature sensor.

According to the dehumidifying system constructed as described above, the regenerating air heated in the condenser 34 is heated by the electric heater 42. Therefore, the regenerating air can be made higher in temperature, and the regenerating ability of the regenerating air in the regenerating zone B can be enhanced. By heating the regenerating air with use of the electric heater 42, temperature control with favorable responsiveness can be performed.

Figure 4:
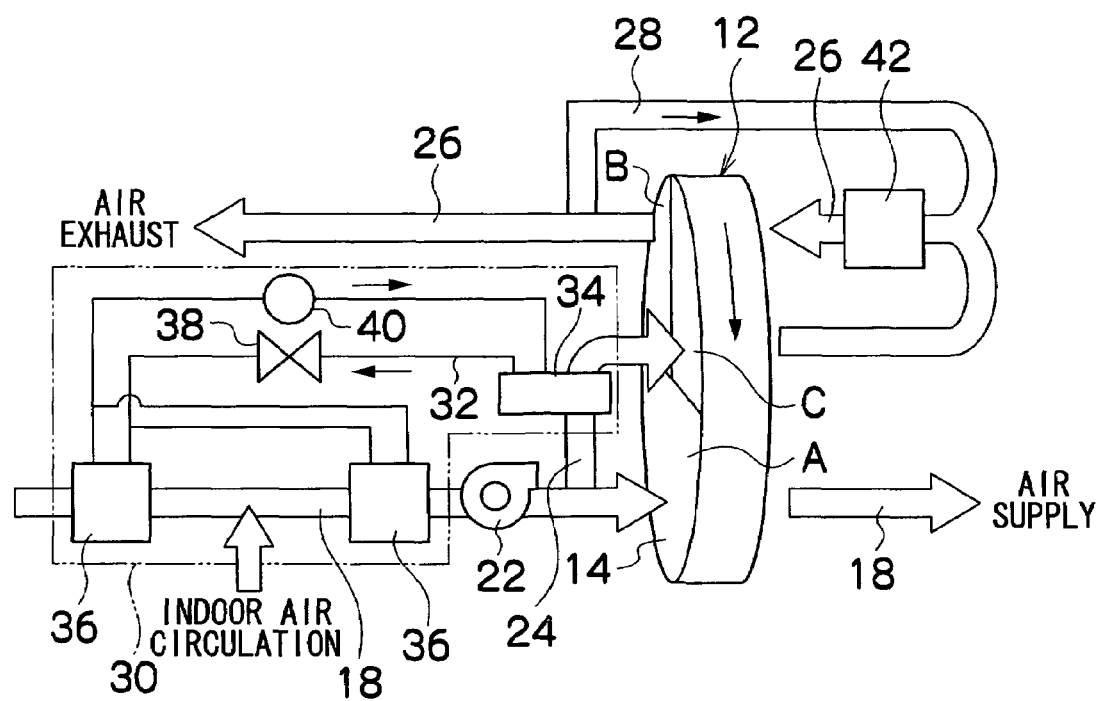
FIG. 4 is a schematic block diagram showing a fourth embodiment of the dehumidifying system according to the present invention.

Next, a fourth embodiment of the dehumidifying system will be described. A dehumidifying system of the fourth embodiment shown in FIG. 4 differs in the respect that the condenser 34 of the heat pump 30 is provided at the diversion line 24 as compared with the dehumidifying system in FIG. 3. Accordingly, the air flowing in the diversion line 24 is heated by the condenser 34, and passes through the purge zone C to be regenerating air. Therefore, a heating amount of the regenerating air by the electric heater 42 can be decreased. The air of the diversion line 24 at low temperature is heated by the condenser 34. Therefore, thermal efficiency can be enhanced, and running cost can be reduced.

The condenser 34 may be provided at the diversion line 24 as described above. The position of the condenser 34 may be any flow passage of the regenerating air, the condenser 34 can be disposed at any line selected from the regenerating line 26, the diversion line 24 and the air circulation line 28, and the like.

Figure 5:
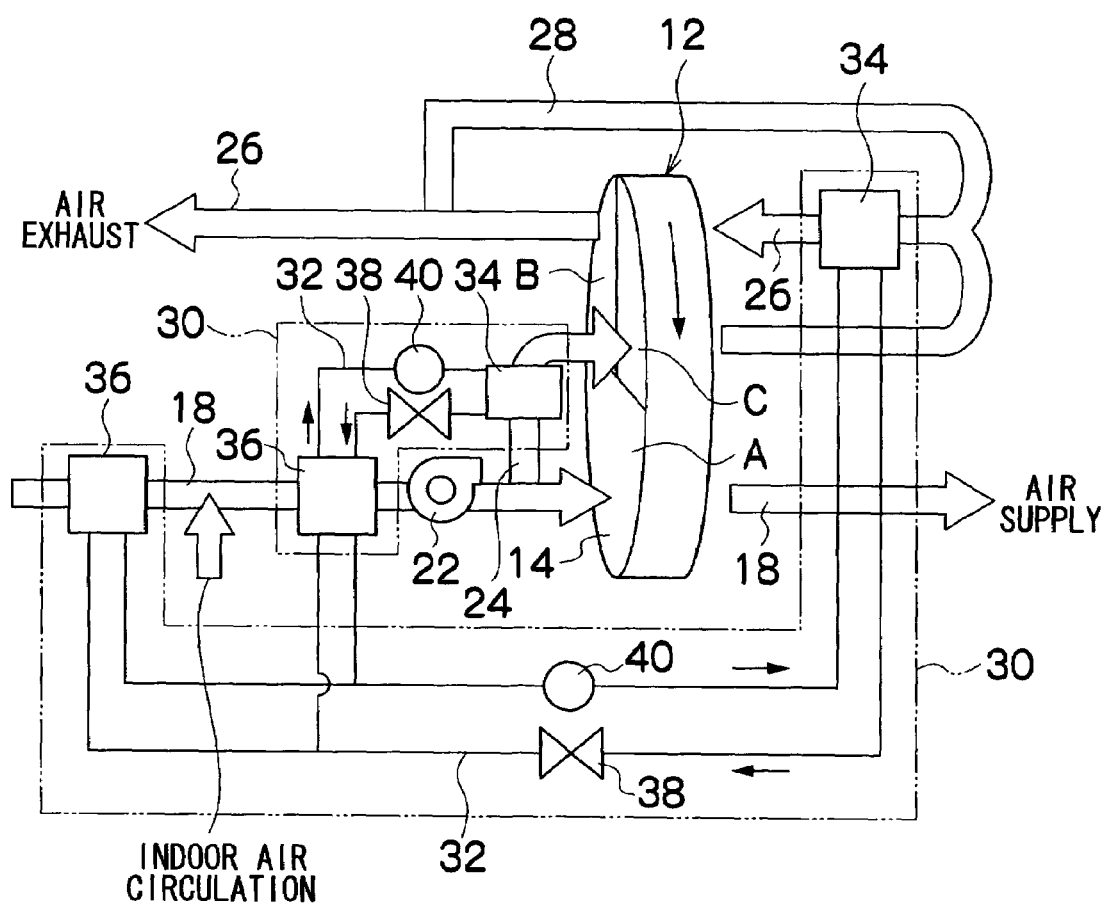
FIG. 5 is a schematic block diagram of a dehumidifying system in which a condenser is disposed at a different position from FIG. 4.

The above described first to fourth embodiments are the examples each provided with only one condenser 34, but a plurality of condensers 34 may be provided. In this case, a plurality of condensers 34 may be connected with the circulation line 32 to form one heat pump cycle, or a plurality of heat pump cycles may be formed as shown in FIG. 5. The dehumidifying system shown in FIG. 5 is provided with the condensers 34 respectively at the regenerating line 26 at the upstream side (right side in FIG. 5) and the diversion line 24, and is provided with two evaporators 36 and 36 at the supply air line 18 at the upstream side (left side in FIG. 5). While the evaporator 36 at the upstream side and the condenser 34 at the regenerating line 26 are connected with the circulation line 32 to construct a first heat pump 30, the evaporator 36 at the downstream side (right side in FIG. 5) and the condenser 34 at the diversion line 24 are connected with the circulation line 32 to construct a second heat pump 30. In the dehumidifying system constructed like this, a cooling amount by the respective condensers 34 and 34 and a heating amount by the respective evaporators 36 and 36 can be individually controlled. Accordingly, finer temperature control can be performed.

Figure 6:
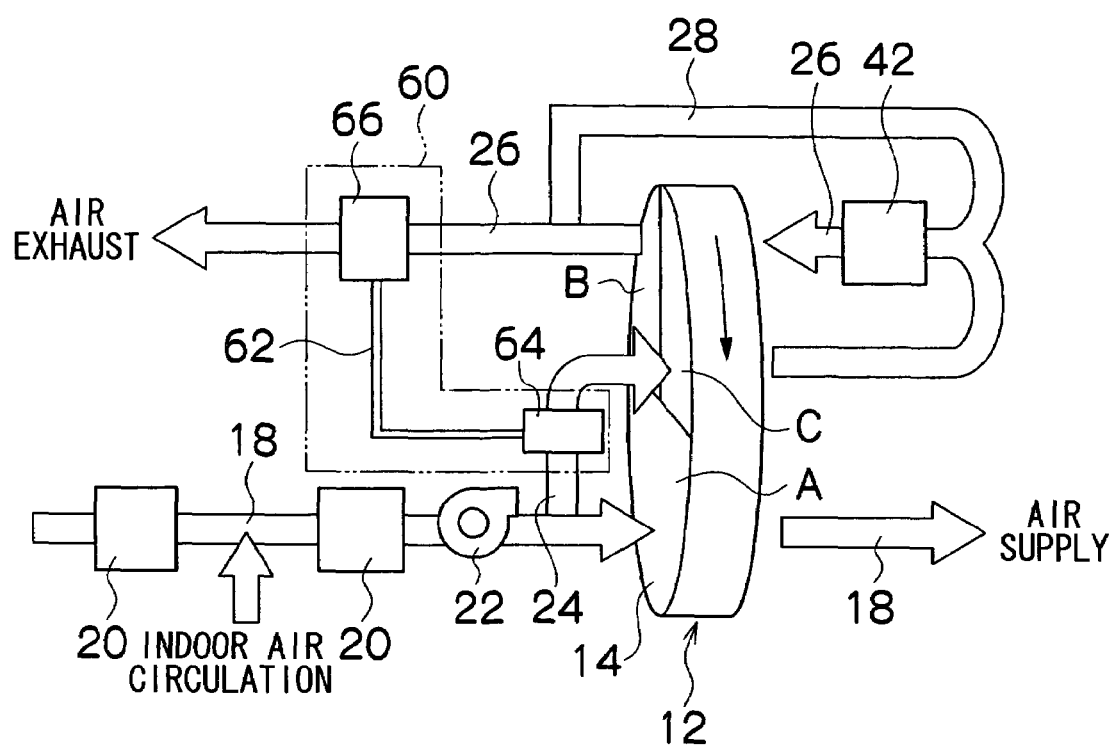
FIG. 6 is a schematic block diagram showing a fifth embodiment of the dehumidifying system according to the present invention.

Next, a fifth embodiment of the dehumidifying system will be described. The dehumidifying system of the fifth embodiment shown in FIG. 6 is an example in which the regenerating air is heated by using a heat pipe 60. The heat pipe 60 has a pipe 62 in which water or a volatile liquid such as ammonia is sealed, and a condensing part 64 and an evaporating part 66 are provided at both end portions of the pipe 62. The condensing part 64 is provided in the diversion line 24 in which low-temperature air flows, and the evaporating part 66 is provided in the regenerating line 26 at the downstream side (left side in FIG. 6) in which high-temperature air flows.

When the condensing part 64 and the evaporating part 66 of the heat pipe 60 are placed as above, the liquid in the pipe 62 evaporates in the evaporating part 66 at high temperature, releases heat in the condensing part 64 at low temperature and is liquefied. Then, the regenerating air flowing in the regenerating line 26 is cooled and air flowing in the diversion line 24 is heated. Accordingly, the regenerating air can be heated by utilizing waste heat of the regenerating air at high temperature flowing in the regenerating line 26. Therefore, energy consumption in the electric heater 42 can be decreased, and energy efficiency can be further enhanced.

As described above, according to the fifth embodiment, by heating the regenerating air by utilizing the heat pipe 60 which does not require motive power, running cost can be reduced. Especially in the fifth embodiment, heat exchange is caused to be performed between the air in the regenerating line 26 and the air in the diversion line 24 with a large temperature difference, and therefore, very high thermal efficiency can be achieved, and running cost can be significantly reduced.

In the above described fifth embodiment, the condensing part 64 of the heat pipe 60 is placed in the diversion line 24, but the present invention is not limited to this, and the condensing part 64 may be placed in any location as long as it is in the flow passage of the regenerating air. Accordingly, it may be provided in the regenerating line 26 at the upstream side (right side in FIG. 6). Similarly, the position of the evaporating part 66 of the heat pipe 60 is not limited to the regenerating line 26, and for example, an external heat source may be utilized.

Figure 7:
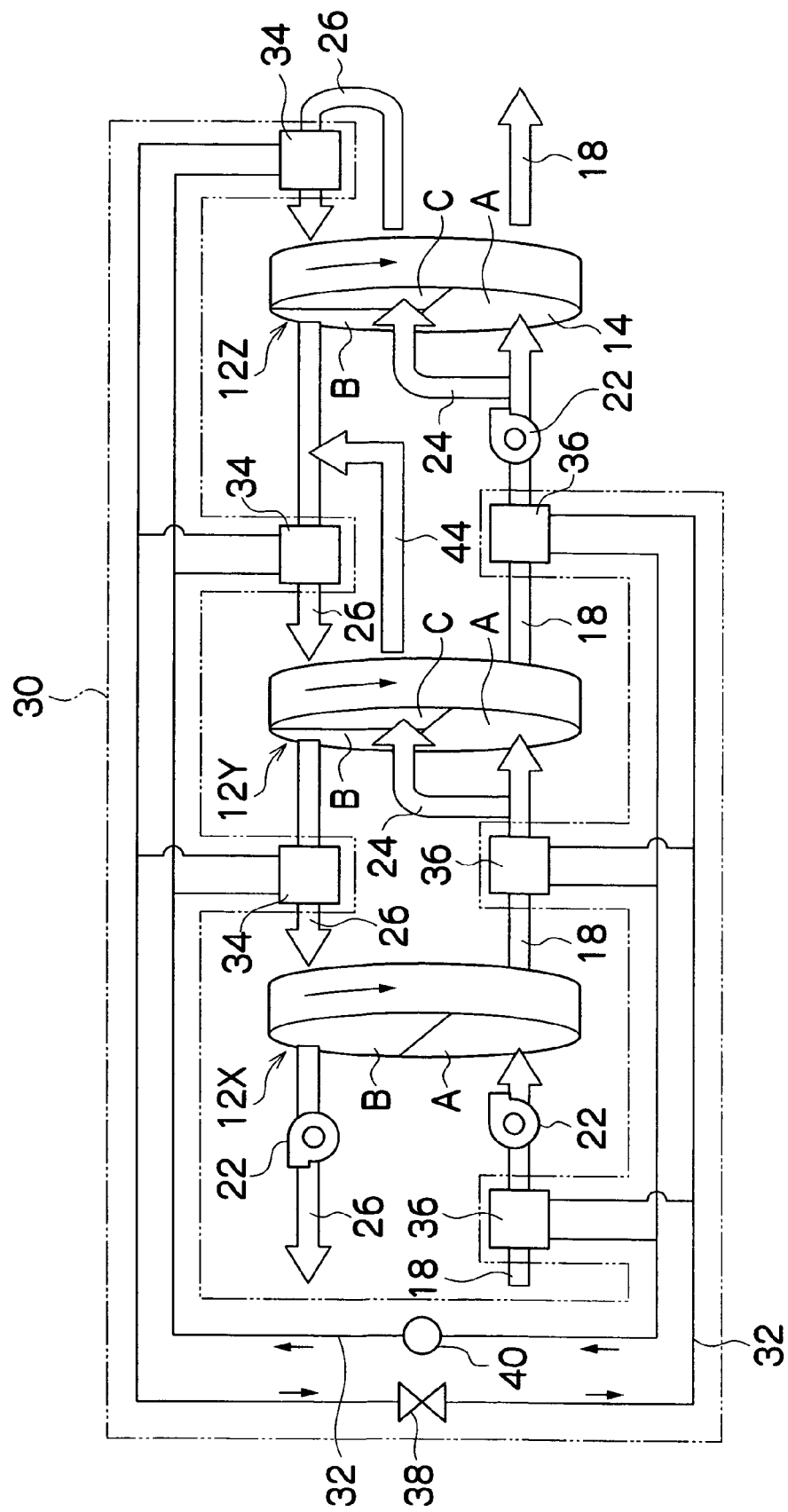
FIG. 7 is a schematic block diagram showing a sixth embodiment of the dehumidifying system according to the present invention.

Next, a sixth embodiment of the dehumidifying system will be described. The sixth embodiment shown in FIG. 7 is an example of a multistage dehumidifying system, and includes a first to a third dehumidifying rotors 12X, 12Y and 12Z. The first dehumidifying rotor 12X includes the dehumidifying zone A and the regenerating zone B, the second dehumidifying rotor 12Y and the third dehumidifying rotor 12Z each include the dehumidifying zone A, the regenerating zone B and the purge zone C.

The supply air lines 18, 18 are connected so that supply air passes through the dehumidifying zone A of the first dehumidifying rotor 12X, the dehumidifying zone A of the second dehumidifying rotor 12Y and the dehumidifying zone A of the third dehumidifying rotor 12Z in sequence and supplied into the low dew-point chamber. Meanwhile, the regenerating lines 26, 26 are connected so that regenerating air passes through the regenerating zone B of the third dehumidifying rotor 12Z, the regenerating zone B of the second dehumidifying rotor 12Y and the regenerating zone B of the first dehumidifying rotor 12X in sequence and discharged.

The diversion line 24 which diverges air passing through the dehumidifying zone A of the first dehumidifying rotor 12X is connected to the purge zone C of the second dehumidifying rotor 12Y, so that the air passing through the purge zone C joins the regenerating air of the regenerating line 26 via a junction line 44. The diversion line 24 which diverges the air passing through the dehumidifying zone A of the second dehumidifying rotor 12Y is connected to the purge zone C of the third dehumidifying rotor 12Z, so that air passing through the purge zone C flows into the regenerating line 26 as the regenerating air.

The supply air line 18 is provided with three evaporates 36. The respective evaporators 36 are placed at the upstream sides (left sides in FIG. 7) of the dehumidifying rotors 12X to 12Z, and the air cooled in the evaporator 36 is supplied to the dehumidifying zones A or the purge zones C of the dehumidifying rotors 12X to 12Z.

Meanwhile, the regenerating line 26 is provided with the three condensers 34. The respective condensers 34 are provided at the upstream sides (right sides in FIG. 7) of the rotors 12X to 12Z, and the air cooled in the condenser 34 is supplied to the regenerating zones B of the dehumidifying rotors 12X to 12Z.

The respective evaporators 36 and the respective condensers 34 are connected to the circulation line 32, and by the heat medium circulating in the circulation line 32, the supply air is cooled in the evaporator 36 and the regenerating air is heated in the condenser 34.

The dehumidifying system constructed as described above performs dehumidifying process of three stages by the three dehumidifying rotors 12X to 12Z, and therefore, air with an ultra low dew-point of $-100°$ C. or lower, for example, can be manufactured.

Further, the above described embodiment uses the condenser 34 of the heat pump 30 as the heating source of the regenerating air, and uses the evaporator 36 as the cooling source of the supply air, and therefore, energy consumption amount required for heating the regenerating air and cooling the supply air can be reduced. Especially by utilizing the heat pump 30 in the case of the multistage dehumidifying system requiring a number of aforementioned heating sources and cooling sources as in the sixth embodiment, energy consumption amount can be significantly reduced.

In the above described embodiment, the three condensers 34 and the three evaporators 36 are connected as one heat pump 30, but the present invention is not limited to this, each condenser 34 and each evaporator 36 may be individually connected, and thereby a plurality of heat pump cycles may be formed.

In the above described embodiment, the three dehumidifying rotors 12X to 12Z are provided, but the number of dehumidifying rotors 12X to 12Z is not limited to this, and two, or four or more may be adopted.

Figure 8:
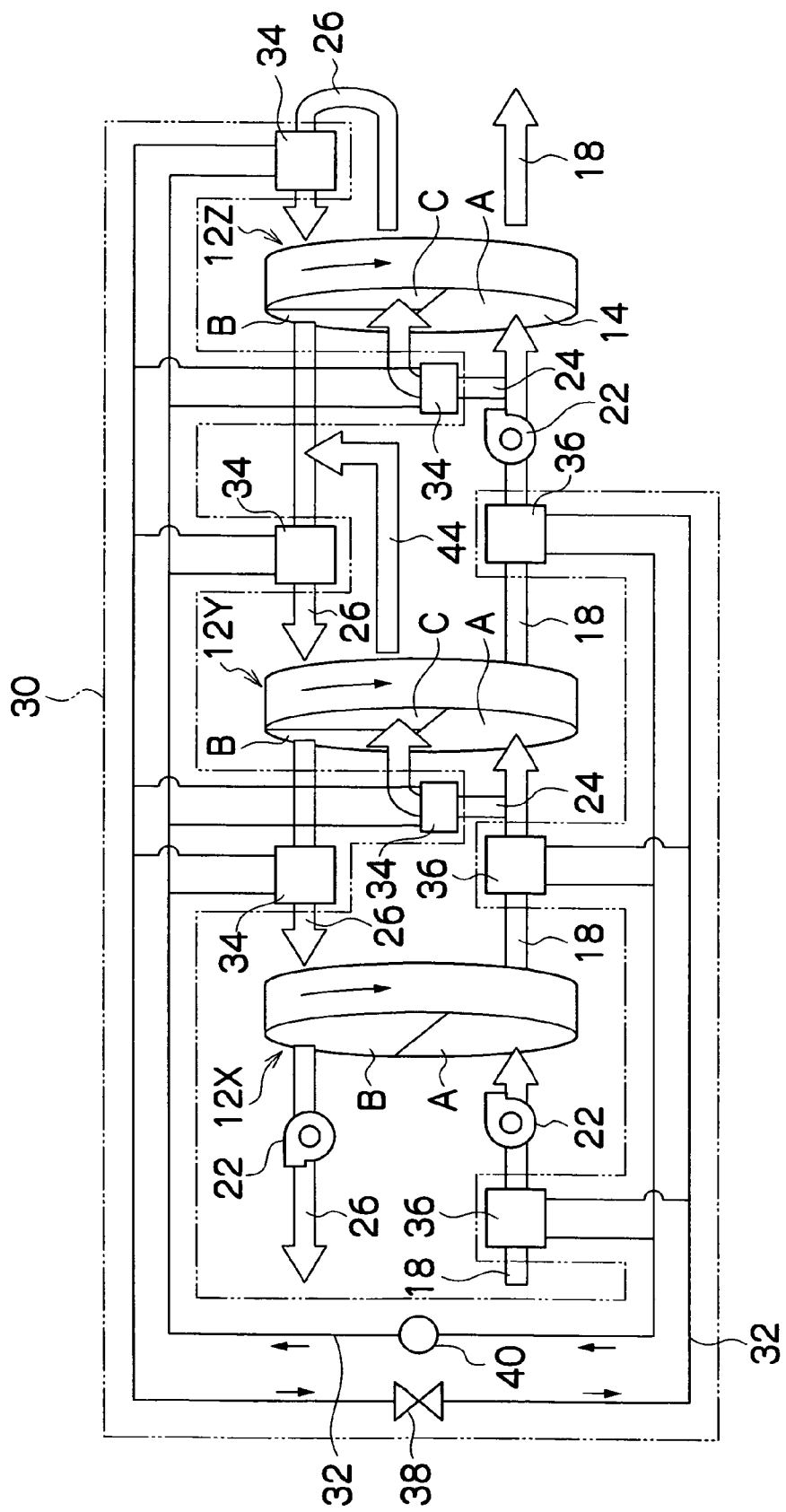
FIG. 8 is a schematic block diagram of a dehumidifying system in which a condenser is disposed at a different position from FIG. 7.
Figure 9:
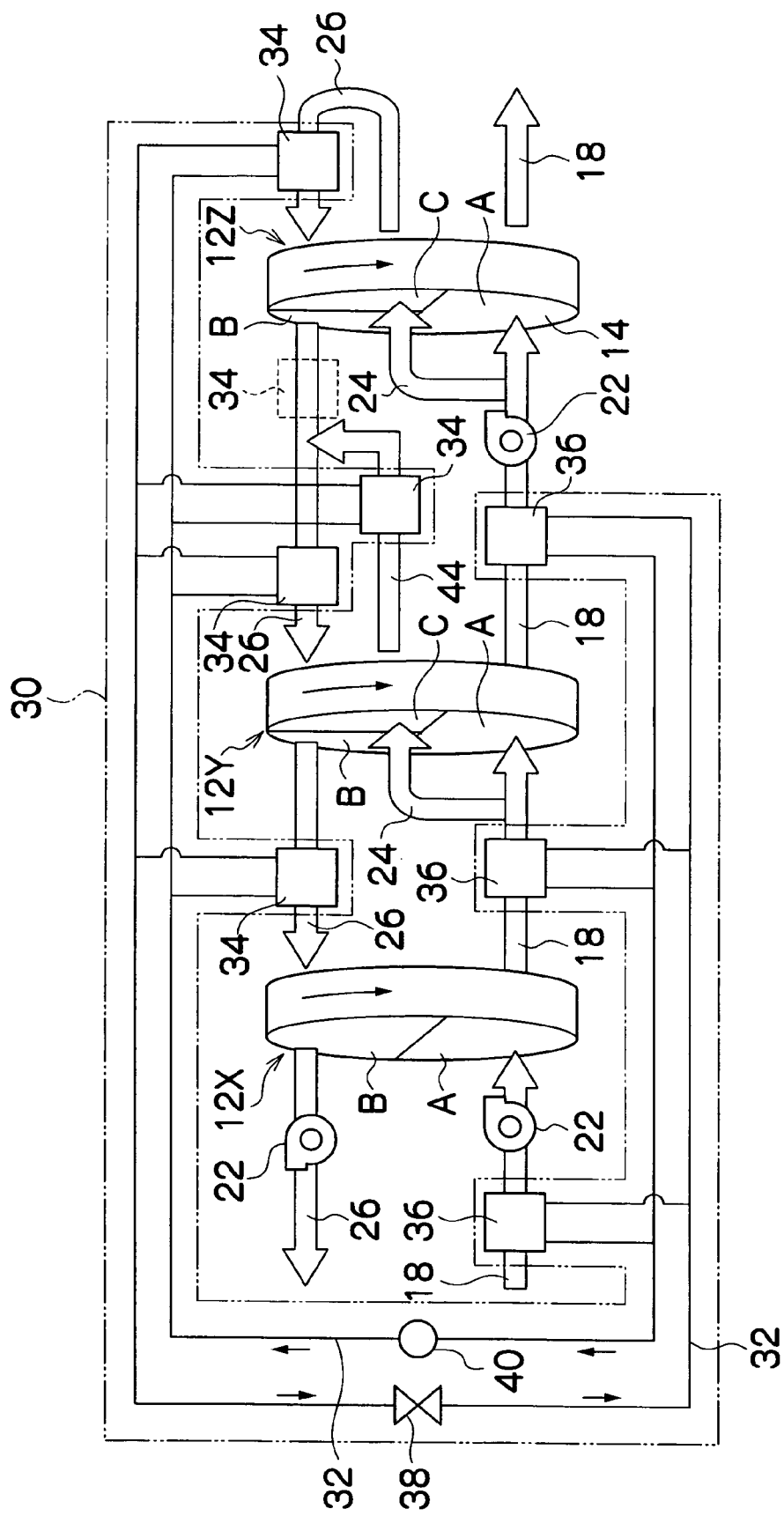
FIG. 9 is a schematic block diagram of a dehumidifying system in which a condenser is disposed at a different position from FIG. 7.

The positions of the condensers 34 are not limited to the embodiment shown in FIG. 7, but they may be any flow passage in which the regenerating air flows. Therefore, the condensers 34 and 34 may be provided in the diversion lines 24 and 24 as shown in FIG. 8. In this case, the low-temperature air flowing through the diversion line 24 is heated, and therefore, heat exchange rate can be enhanced. As shown in FIG. 9, the condenser 34 may be placed in the junction line 44 as shown in FIG. 9, and the condenser 34 may be placed in the regenerating line 26 before the junction line 44 joins it as shown by the dotted line in FIG. 9.

In the case of the above described sixth embodiment, the regenerating air may be heated by using the heat pump 30 and the electric heater 42 (see FIG. 3) in combination. Waste heat of the regenerating air may be recovered by utilizing the heat pipe 60 shown in FIG. 6 and may be utilized for heating the regenerating air.

What is claimed is:
1. A dehumidifying system, comprising:
   a dehumidifier having a dehumidifying zone which is provided at a flow passage of supply air supplied to a low dew-point chamber and dehumidifies the supply air with a dehumidifying member and a regenerating zone which allows regenerating air to pass through the dehumidifying member to regenerate the dehumidifying member;
   a diversion line which divides the supply air to be passed through the dehumidifying member and supplies the air passed through the dehumidifying member as regenerating air to the regeneration zone;

a condenser of a heat pump provided at the diversion line upstream of the dehumidifying member; and heating the regenerating air, an evaporator of the heat pump provided at the flow passage of the supply air upstream of the dehumidifying member.

2. The dehumidifying system according to claim 1, wherein an electric heater is provided at the flow passage of the regenerating air.

3. A dehumidifying system comprising:

a dehumidifier having a dehumidifying zone which is provided at a flow passage of supply air supplied to a low dew-point chamber and dehumidifies the supply air with a dehumidifying member and a regenerating zone which allows regenerating air to pass through the dehumidifying member to regenerate the dehumidifying member;

a diversion line which divides the supply air to be passed through the dehumidifying member and supplies the air passed through the dehumidifying member as regenerating air to the regeneration zone; and a condenser of a heat pipe pipe provided at the diversion line upstream of the dehumidifying member and heating the regenerating air.

4. The dehumidifying system according to claim 3, wherein an evaporating part of the heat pipe is provided at the flow passage of the regenerating air after passing through the regenerating zone.

* * * * *